United States Patent
Aldrich (10) Patent No.: US 9,949,561 B2
(45) Date of Patent: Apr. 24, 2018

(54) STAND WITH MAGNETIC RETENTION FOR PORTABLE DEVICES

(71) Applicant: Ergotron, Inc., St. Paul, MN (US)

(72) Inventor: Stuart Ripley Aldrich, North Bennington, VT (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 15/071,954

(22) Filed: Mar. 16, 2016

(65) Prior Publication Data

US 2016/0270525 A1 Sep. 22, 2016

Related U.S. Application Data

(60) Provisional application No. 62/134,103, filed on Mar. 17, 2015.

(51) Int. Cl.
| | |
|---|---|
| *A47F 5/12* | (2006.01) |
| *A47G 1/17* | (2006.01) |
| *F16M 11/06* | (2006.01) |
| *F16M 13/00* | (2006.01) |
| *F16M 11/04* | (2006.01) |

(Continued)

(52) U.S. Cl.
CPC ............ *A47B 21/04* (2013.01); *A47B 13/023* (2013.01); *A47B 19/06* (2013.01); *A47B 21/02* (2013.01); *A47B 39/02* (2013.01); *F16B 1/00* (2013.01); *F16M 11/041* (2013.01); *F16M 11/18* (2013.01); *F16M 11/28* (2013.01);

(Continued)

(58) Field of Classification Search
CPC ....... A47B 23/02; A47B 23/04; A47B 23/046; A47B 13/023; A47B 21/04; F16M 11/14; F16M 11/18; F16M 11/28; F16M 11/42

USPC ............ 248/444.1, 161, 188.2, 188.8, 206.5, 248/309.4, 127, 683; 108/13, 142, 150; 361/679.55
See application file for complete search history.

(56) References Cited

U.S. PATENT DOCUMENTS

| | | | | |
|---|---|---|---|---|
| 5,161,766 | A | * | 11/1992 | Arima ................... A47B 23/02 248/444.1 |
| 5,615,620 | A | * | 4/1997 | Owen .................... A47B 23/04 108/150 |

(Continued)

FOREIGN PATENT DOCUMENTS

| | | |
|---|---|---|
| CN | 201700674 U | 1/2011 |
| CN | 201790253 U | 4/2011 |

(Continued)

OTHER PUBLICATIONS

"Application Serial No. PCT/US2016/022650, Invitation to Pay Additional Fees and Partial Search Report dated Jun. 7, 2016", 28 pgs.

(Continued)

*Primary Examiner* — Tan Le
(74) *Attorney, Agent, or Firm* — Schwegman Lundberg & Woessner, P.A.

(57) ABSTRACT

A computing stand for supporting an electronic device, the stand comprising: a work surface; one or more magnets positioned on the work surface; a riser attached to the work surface; and a base attached to the riser, wherein the one or more magnets are positioned to attract to one or more magnets associated with at least one of the electronic device, a keyboard of the electronic device, and a kickstand of the electronic device.

20 Claims, 7 Drawing Sheets

(51) Int. Cl.
    *F16M 11/42*     (2006.01)
    *F16B 1/00*     (2006.01)
    *F16M 11/18*     (2006.01)
    *F16M 11/28*     (2006.01)
    *A47B 21/04*     (2006.01)
    *A47B 13/02*     (2006.01)
    *A47B 19/06*     (2006.01)
    *A47B 39/02*     (2006.01)
    *A47B 21/02*     (2006.01)
    *H01F 7/02*     (2006.01)

(52) U.S. Cl.
    CPC ............ *F16M 11/42* (2013.01); *F16M 13/00* (2013.01); *H01F 7/0205* (2013.01); *F16B 2001/0035* (2013.01)

(56) References Cited

U.S. PATENT DOCUMENTS

| | | | | |
|---|---|---|---|---|
| 6,327,982 | B1* | 12/2001 | Jackson | A47B 23/046 108/142 |
| 6,840,180 | B2* | 1/2005 | Ulmer | A47B 13/023 108/13 |
| 7,374,142 | B2* | 5/2008 | Carnevali | F16M 11/04 224/183 |
| 9,377,156 | B2* | 6/2016 | Wong | F16M 11/14 |
| 2003/0038782 | A1 | 2/2003 | Dobrich | |
| 2004/0174671 | A1* | 9/2004 | Huang | G06F 1/1632 361/679.55 |
| 2010/0238620 | A1 | 9/2010 | Fish | |
| 2011/0170252 | A1 | 7/2011 | Jones et al. | |
| 2016/0270525 | A1* | 9/2016 | Aldrich | A47B 21/04 |

FOREIGN PATENT DOCUMENTS

| | | |
|---|---|---|
| CN | 203353955 U | 12/2013 |
| CN | 203723657 U | 7/2014 |
| WO | WO-2011021023 A1 | 2/2011 |
| WO | WO-2016149374 A1 | 9/2016 |

OTHER PUBLICATIONS

"International Application Serial No. PCT/US2016/022650, International Search Report dated Aug. 12, 2016", 7 pgs.

"International Application Serial No. PCT/US2016/022650, Written Opinion dated Aug. 12, 2016", 7 pgs.

"International Application Serial No. PCT/US2016/022650, International Preliminary Report on Patentability dated Sep. 28, 2017", 9 pgs.

* cited by examiner

STAND WITH MAGNETIC RETENTION FOR PORTABLE DEVICES

CLAIM OF PRIORITY

This application claims the benefit of priority of U.S. Provisional Patent Application Ser. No. 62/134,103, titled STAND WITH MAGNETIC RETENTION FOR PORTABLE DEVICES, to Stuart Ripley Aldrich, filed on Mar. 17, 2015, which is incorporated by reference herein in its entirety.

TECHNICAL HELD

This disclosure generally relates to computing stands.

BACKGROUND

Computing stands are used to provide portable computing capabilities to workers in a variety of settings. One example includes computing stands used by health care professionals in a hospital or clinic setting. Another example includes computing stands used by teachers in a school setting. In many cases a computing stand generally includes a wheeled base that supports a computing device, e.g., a portable electronic device, such as a tablet computer. Existing stands use a frame or clamp to retain a portable electronic device.

OVERVIEW

This disclosure describes various techniques for releasably retaining an electronic device to a computing stand, e.g., a mobile computing stand, using magnetic latching.

To further illustrate the STAND WITH MAGNETIC RETENTION FOR PORTABLE DEVICES disclosed herein, a non-limiting list of examples is provided here:

In Example 1, a computing stand for supporting an electronic device, the stand can comprise: a work surface; one or more magnets positioned on the work surface; a riser attached to the work surface; and a base attached to the riser, wherein the one or more magnets are positioned to attract to one or more magnets associated with at least one of the electronic device, a keyboard of the electronic device, and a kickstand of the electronic device.

In Example 2, the computing stand of Example 1 can optionally be configured such that the work surface defines a recessed portion, and wherein the one or more magnets are positioned within the recessed portion.

In Example 3, the computing stand of Example 2 can optionally be configured such that the recessed portion is a groove extending substantially parallel to a rear edge of the work surface.

In Example 4, the computing stand of any one or any combination of Examples 1-3 can optionally be configured such that the one or more magnets are grouped in a set of magnets having at least a first magnet and a second magnet.

In Example 5, the computing stand of Example 4 can optionally be configured such that the work surface has an upper surface and a lower surface, wherein the first magnet has a first polarity located near the upper surface and the second magnet has a second polarity located near the upper surface.

In Example 6, the computing stand of any one or any combination of Examples 1-5 can optionally be configured such that the one or more magnets are grouped in a set of magnets having at least a first magnet, a second magnet, and a third magnet.

In Example 7, the computing stand of Example 6 can optionally be configured such that the work surface has an upper surface and a lower surface, wherein the first magnet has a first polarity located near the upper surface, the second magnet has a second polarity located near the upper surface, and the third magnet has the first polarity located near the upper surface.

In Example 8, the computing stand of any one or any combination of Examples 4-7 can optionally be configured to further comprise at least two sets of magnets.

In Example 9, the computing stand of any one or any combination of Examples 4-8 can optionally be configured to further comprise four sets of magnets that are spaced to provide a first holding position, a second holding position and a third holding position, wherein each holding position includes two sets of magnets.

In Example 10, the computing stand of any one or any combination of Examples 4-9 can optionally be configured such that the first magnet and the second magnet are located to correspond with a location of magnets in the at least one of the electronic device, the keyboard of the electronic device and the kickstand of the electronic device, the first magnet and the second magnet having opposite polarity with corresponding magnets in the at least one of the electronic device, the keyboard of the electronic device, and the kickstand of the electronic device.

In Example 11, the computing stand of any one or any combination of Examples 1-10 can optionally be configured such that the riser is a height adjustable riser that includes a stationary column and a movable column.

In Example 12, the computing stand of Example 11 can optionally be configured such that the height adjustable riser includes an energy storage member.

In Example 13, the computing stand of any one or any combination of Examples 11-12 can optionally be configured to further comprise a control handle, wherein the control handle is configured to release and latch the height adjustable riser.

In Example 14, the computing stand of any one or any combination of Examples 1-13 can optionally be configured such that the work surface includes a substrate and a cover disposed over the substrate.

In Example 15, the computing stand of any one or any combination of Examples 1-14 can optionally be configured such that the base includes one or more wheels.

In Example 16, the computing stand of any one or any combination of Examples 1-15 can optionally be configured such that the work surface includes a protruding structure configured to retain an edge of the at least one of the electronic device, the keyboard, and the kickstand.

In Example 17, a device for supporting an electronic device, the device can comprise: a work surface defining a recessed portion, the work surface including: an upper surface; a lower surface; one or more magnet sets positioned in the recessed portion, each magnet set including a first magnet and a second magnet, the first magnet having a first polarity located near the upper surface and the second magnet having a second polarity located near the upper surface, wherein the one or more magnet sets are positioned to attract to one or more magnets associated with at least one of an electronic device, a keyboard of the electronic device, and a kickstand of the electronic device.

In Example 18, the device of Example 17 can optionally be configured to further comprise: a height adjustable riser coupled to the work surface and a wheeled base coupled to the height adjustable riser.

In Example 19, the device of any one or any combination of Examples 17-18 can optionally be configured to further comprise four sets of magnets that are spaced to provide a first holding position, a second holding position, and a third holding position, wherein each holding position includes two sets of magnets.

In Example 20, a device for supporting an electronic device, the device can comprise: a work surface defining a recessed portion, the work surface including: an upper surface; a lower surface; at least one or more magnets positioned in the recessed portion, wherein the at least one or more magnets are positioned to attract to one or more magnets associated with at least one of an electronic device, a keyboard of the electronic device, and a kickstand of the electronic device, wherein at least one of the at least one or more magnets includes a south pole and a north pole and wherein both the north pole and the south pole are near an upper surface of the work surface.

In Example 21, the computing stand, the device, or the device for supporting an electronic device of any one or any combination of Examples 1-20 can optionally be configured such that all elements, operations, or other options recited are available to use or select from.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This disclosure describes various techniques for releasably retaining an electronic device to a computing stand, e.g., a mobile computing stand, using magnetic latching. The present inventor has recognized a need for a work surface, such as that on a desktop or computing stand to hold or retain an electronic device in place without the use of frames, clamps, screws, and the like, thereby eliminating the need to tighten, loosen, and sterilize (which is desirable in a hospital setting) the retaining structure. The magnetic latching can hold the electronic device, e.g., a portable electronic device, a portable computing device, a laptop, a cell phone, a tablet computer such as a Microsoft Surface, Apple iPad, and the like, on a work surface of a computing stand in place. Such retaining of the electronic device can prevent the electronic device from shifting position during use or movement of the computer stand. Positioning and orienting one or more magnets in the work surface, e.g., in a groove or other recessed portion or cavity and/or under the top "skin" of the stand, to correspond to one or more magnets in the device and/or device keyboard, can hold the device in place but allow the device to be easily removed when desired.

Figure 1:
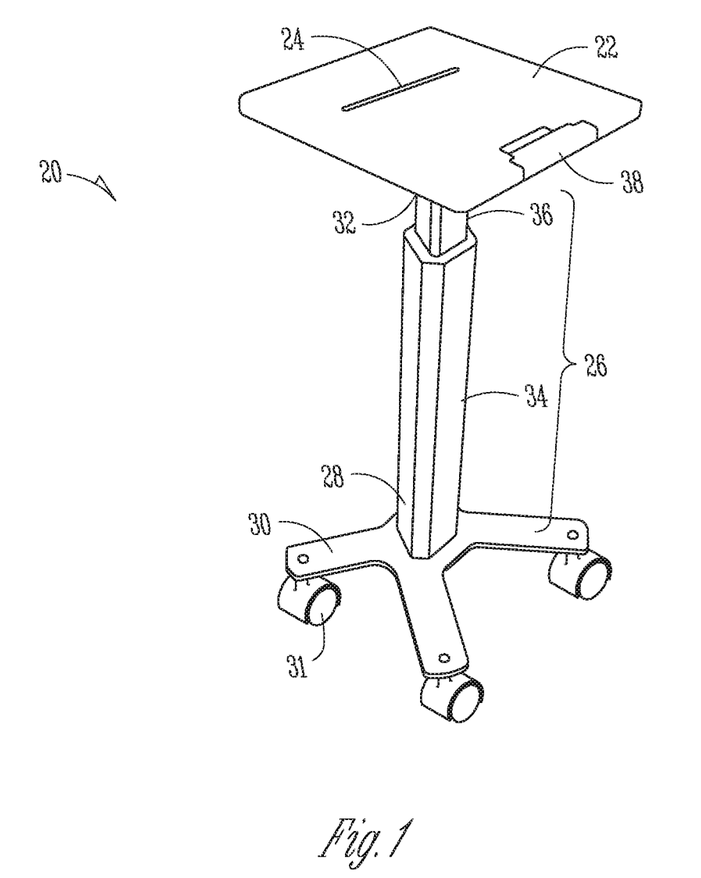
FIG. 1 is a perspective view of an example of a computing stand, in accordance with at least one example of this disclosure.

FIG. 1 is a perspective view of an example of a computing stand 20, in accordance with at least one example of this disclosure. As shown and described in more detail below, the example computing stand 20 depicted in FIG. 1 can include a work surface 22 defining a groove 24 (or other recessed portion or cavity) that can include one or more magnets for releasably retaining an electronic device. In some examples, the work surface 22 can include a cover, e.g., a metal cover or plastic cover. In another example, magnets can be placed in any shaped cavity in the work surface 22. In another example, magnets can be molded or formed into a substrate of the work surface 22.

In some examples, the computing stand 20 can include a height adjustable riser 26. A bottom end 28 of the height adjustable riser 26 can be attached to a base 30 and a top end 32 of the height adjustable riser 26 can be attached to the work surface 22. The base 30 can include one or more wheels 31. In some examples, the height adjustable riser 26 can include a stationary column 34 and a movable column 36 sized and shaped to telescope into and out of the stationary column 34. In another example, the movable column 36 can move along a side of the stationary column 34. The riser 26 can be raised and lowered using an energy storage device, such as a spring, a gas spring, a resilient member, or, a linear actuator, for example. The computing stand 20 can include one or more handles, e.g., a handle 38 at a front edge, as shown in FIG. 1. The computing stand can include latching means to unlock or lock the height adjustment of the height adjustable riser 26.

In general, magnets can be used to attach a cover and/or a keyboard to the electronic device, such as a Microsoft Surface, an Apple iPad, or other tablet or computing device. At least one of the device (e.g., a tablet), a case for the device, and the keyboard of the device can include the magnets. In accordance with various techniques of this disclosure, one or more magnets positioned on or within the work surface 22 can attach the electronic device to the computing stand 20 using the magnets that are included with the device, case, and/or keyboard.

Figure 2:
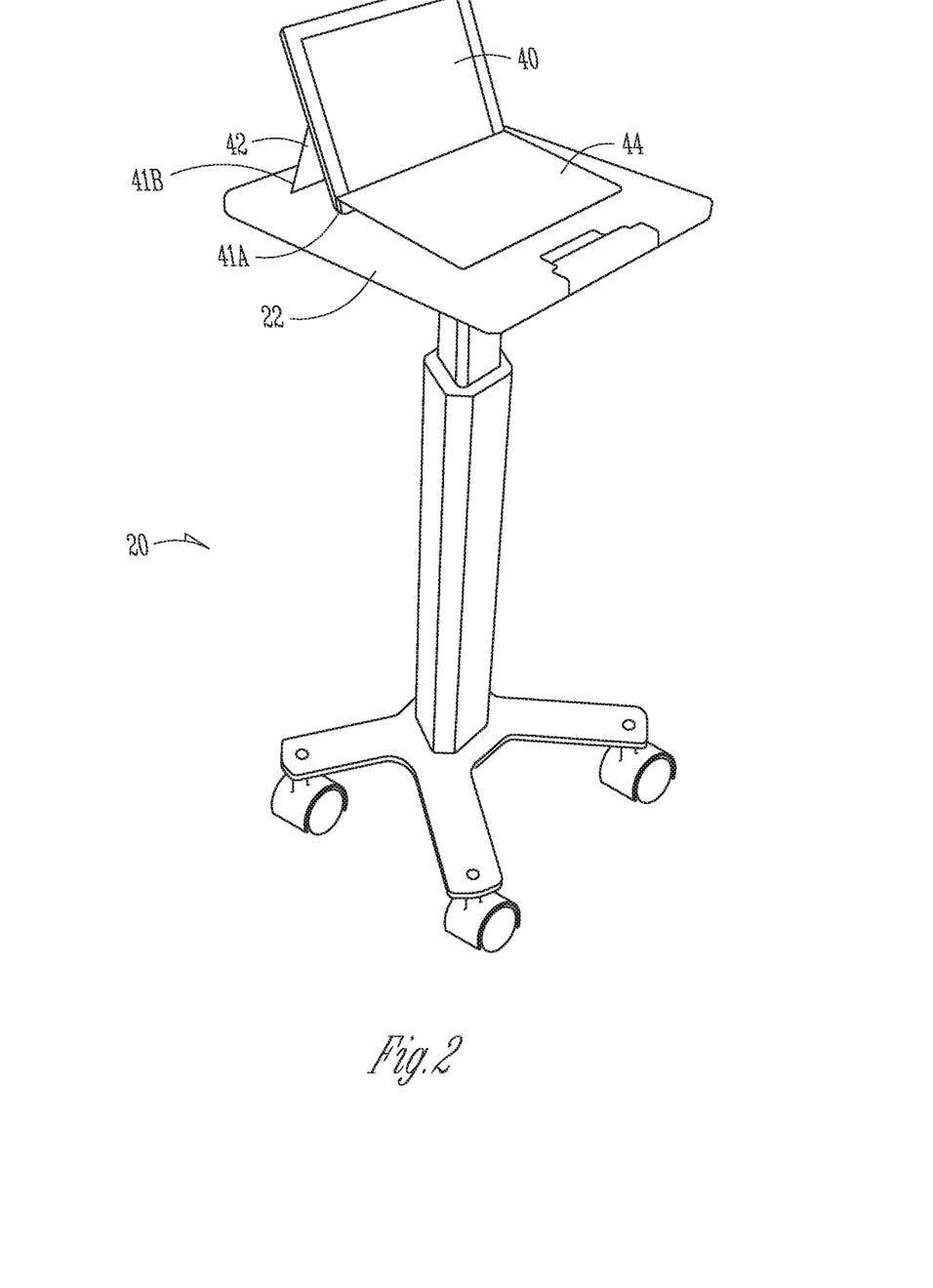
FIG. 2 is a perspective view of the computing stand of FIG. 1 with an electronic device, in accordance with at least one example of this disclosure.

FIG. 2 is a perspective view of the computing stand 20 of FIG. 1 with an electronic device 40, in accordance with at least one example of this disclosure. In FIG. 2, an edge 41A of the electronic device 40, (e.g., a portable computing device a portable electronic device, a tablet, a laptop, a cell phone) can be positioned within the groove 24 defined by the work surface 22 (depicted in FIG. 1) and the device 40 can be supported in an upright position by the kickstand 42 of the device 40. In another example, an edge 41B of the kickstand 42 can be located in the groove 24. It can be desirable to properly space and align a polarity of the magnet(s) in the work surface 22, e.g., a north pole of a stand magnet paired with a south pole of a device magnet, such as the magnets in the device, case, and/or keyboard. In one example, the magnet(s) of the computing stand 20 can hold the device 40 to the work surface 22 and/or the groove 24 and can keep the device 40 from moving from a desired position.

Figure 3:
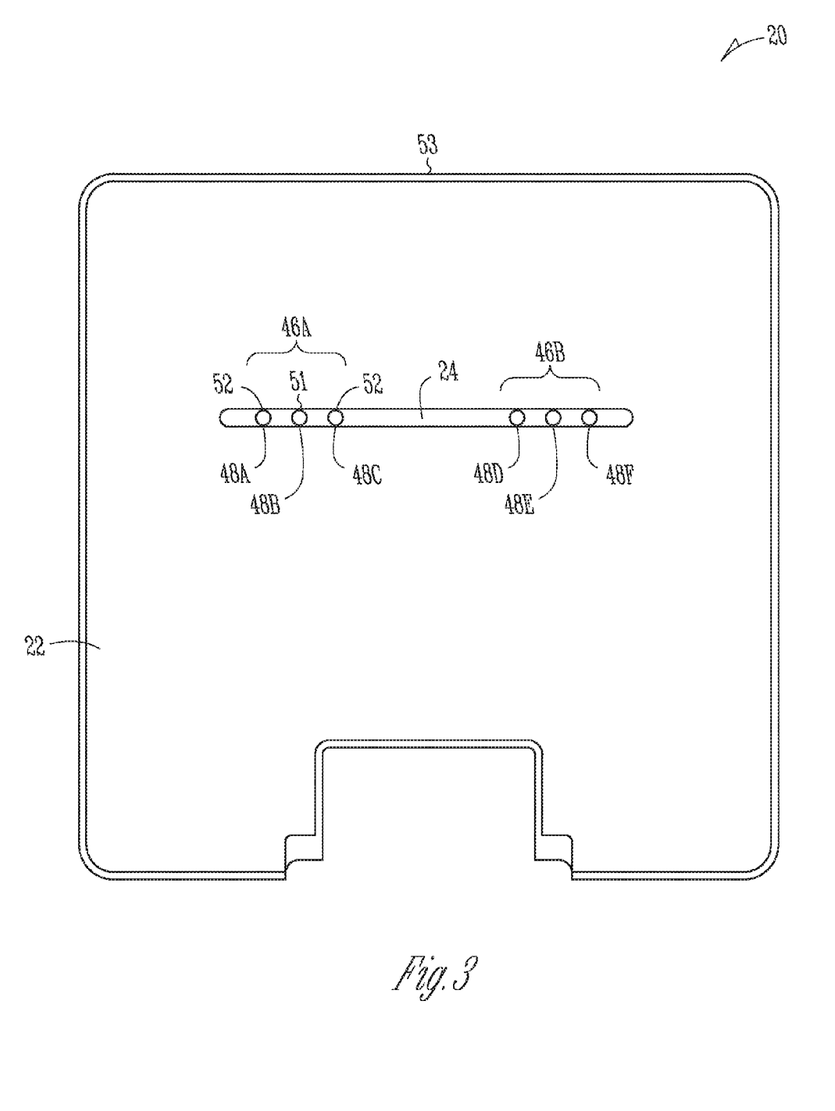
FIG. 3 is a top view of an example of a work surface of a computing stand, in accordance with at least one example of this disclosure.

FIG. 3 is a top view of an example of a work surface 22 of a computing stand 20, in accordance with at least one example of this disclosure. The example shown in FIG. 3 can include a first magnet set 46A and a second magnet set 46B. Each magnet set 46A, 46B can include one or more magnets 48A-F. The first and second magnet sets 46A, 46B can be positioned within the groove 24 of the work surface 22. Each of the two magnet sets 46A, 46B shown can include three magnets 48A-C and 48D-F. Some example configurations can include more or fewer magnets in a magnet set, and/or more or fewer sets of magnets (see FIG. 4). In an example, magnets 48A-F are located in the work surface 22 such that only one of the poles of each magnet are near the upper surface of the work surface 22. In an examples a lengthwise dimension of the magnets 48A-F can be substantially parallel with the width of the work surface 22. In an example, as described below in FIG. 6, the lengthwise dimension of magnets 70A-D can be located so that both poles of each magnet are near the surface of the work station 22. The lengthwise dimension of one or more of the magnets can be substantially parallel to the surface of the work surface 22.

As mentioned above, a first polarity 50 of one or more of the magnets 48A-F in the work surface 22, (e.g., a north pole) can be paired with a second polarity, (e.g., a south pole) of a magnet in an electronic device 40, such as magnets in the device, case, and/or keyboard as shown in FIG. 2. In another example, the second polarity 52 of one or more of the magnets 48A-F in the work surface 22, (e.g., a south pole) can be paired with a first polarity, (e.g., a north pole) of a magnet in an electronic device 40, such as magnets in the device, case, and/or keyboard as shown in FIG. 2. FIG. 3 depicts one example polarity arrangement. The magnetic pole orientation of the three magnets 48A-C in the first magnet set 46A can be ordered S-N-S or the second polarity 52, the first polarity 50, and the second polarity 52. The three magnets 48D-F in the second magnet set 46B can be similarly arranged. This example is one non-limiting example configuration for purposes of illustration only. The magnets 48A-C, 48D-F, in a set of magnets, 46A, 46B can be positioned and arranged in any order, but will generally be arranged to pair with and be attracted to the magnets of the electronic device 40 (see FIG. 2).

The groove 24 can be positioned in any manner in order to provide a desired position of a retained electronic device. In an example, the groove 24 can extend substantially parallel to a rear edge 53 of the work surface 22.

Figure 4:
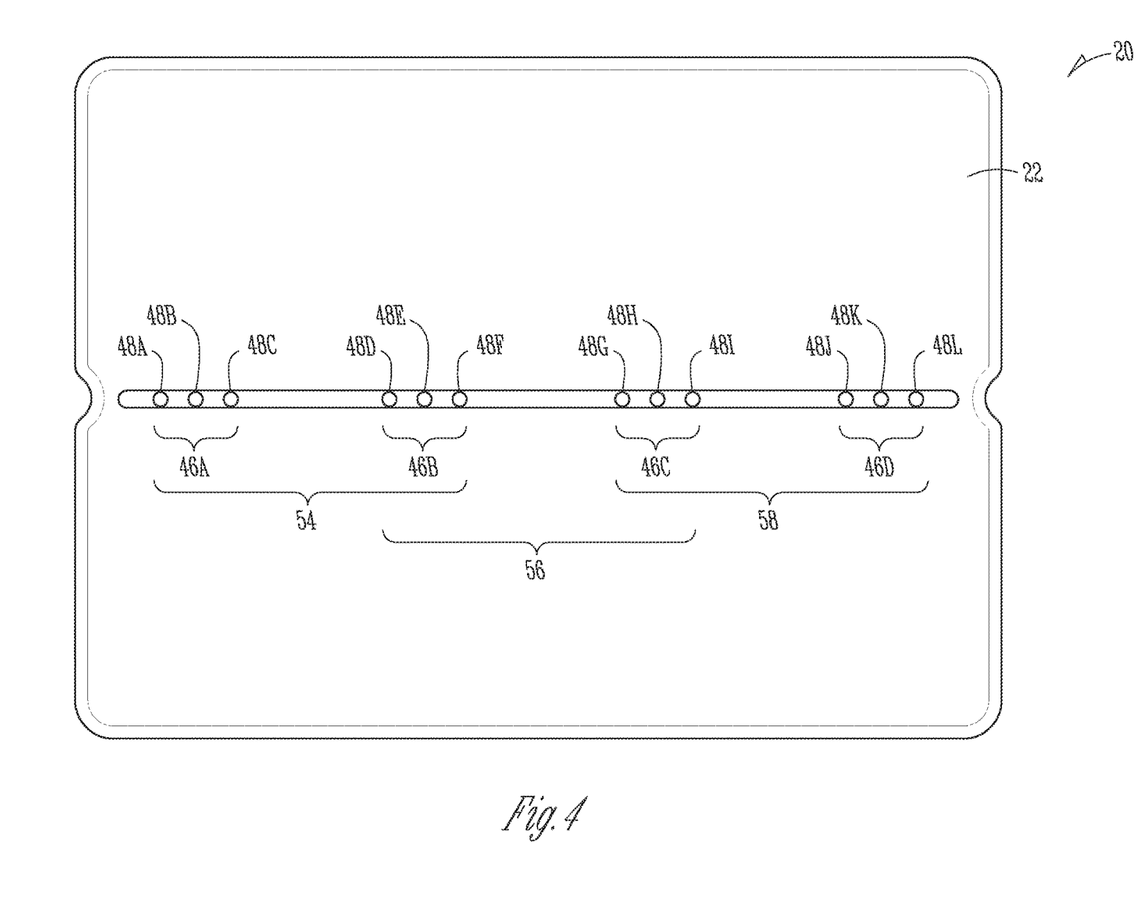
FIG. 4 is a top view of another example of a work surface of a computing stand, in accordance with at least one example of this disclosure.

FIG. 4 is a top view of another example of a work surface 22 of a computing stand 20, in accordance with at least one example of this disclosure. The work surface 22 depicted in FIG. 4 can includes four sets of magnets, namely a first magnet set 46A, a second magnet set 46B, a third magnet set 46C, and a fourth magnet set 46D. In the example shown in FIG. 4, each of the four sets of magnets 46A-D can include three magnets such as magnets 48A-C, 48D-F, 48G-I, and 48J-L, but more or fewer magnets can be used.

In one example, the groove 24 in FIG. 4 can be longer than the groove 24 shown in FIG. 3, which can allow additional sets of magnets to be used. The additional sets of magnets can provide a user with multiple positions at which to locate the electronic device 40 (see FIG. 2) and can allow the user to more fully utilize the work surface 22 area. For example, assuming that the electronic device 40 includes two sets of magnets, the electronic device 40 can be located near the left side of the groove 24 at a first holding position 54, near the center of the groove 24 at a second holding position 56, or near the right side of the groove 24 at a third holding position 58.

Figure 5A:
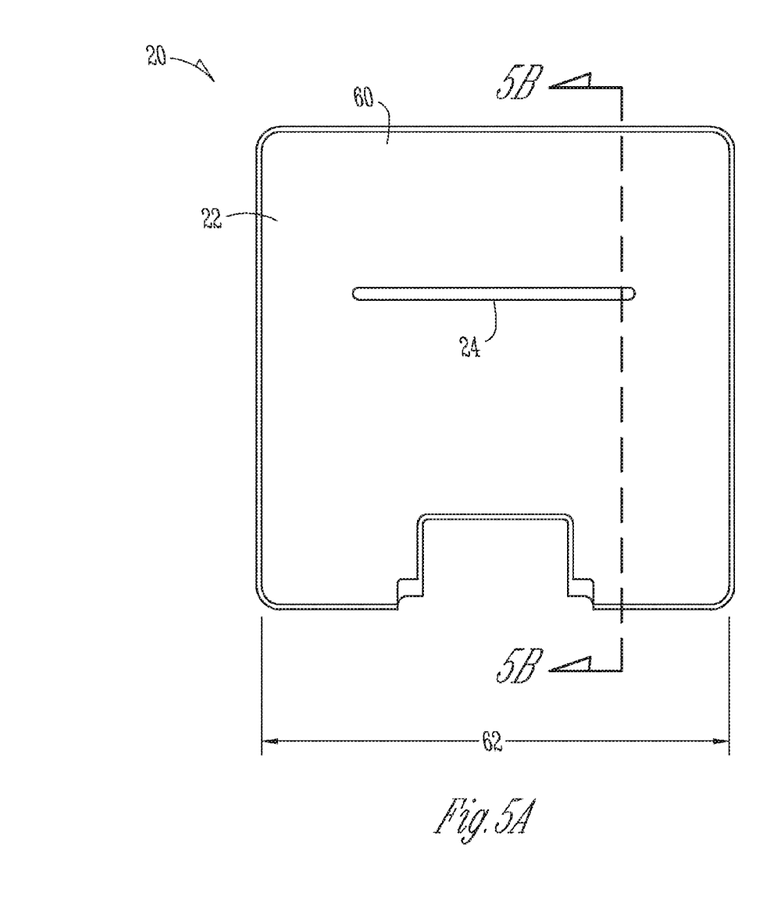
FIG. 5A is a top view of an example of a work surface of a computing stand, in accordance with at least one example of this disclosure.

FIG. 5A is a top view of an example of a work surface of a computing stand 20, in accordance with at least one example of this disclosure. In the example in FIG. 5A, a cover 60 can be located on or coupled to the work surface 22. The cover 60 can include materials such as plastics, polymers, rubbers, metals, composites, or combinations of two or more of the aforementioned materials. In an example the cover 60 can be a thermoformed membrane plastic cover.

The groove 24 shown in FIG. 5A can be substantially centered across the width 62 of the work surface 22 in other example configurations, the groove 24 can be shifted toward the right or left side of the work surface 22. In one example configuration, the groove 24 can extend across substantially the entire width 62 of the work surface 22.

Figure 5B:
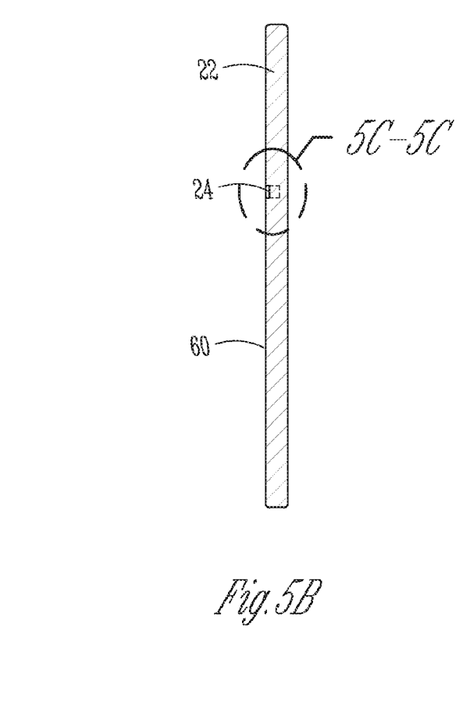
FIG. 5B is a sectional view taken along the line 5B-5B of FIG. 5A.

FIG. 5B is a sectional view taken along the line 5B-5B of FIG. 5A. As seen in FIG. 5B, the groove 24 can be relatively narrow, which can allow the groove 24 to hold the edge 41A of the electronic device 40 (see FIG. 2). The groove 24 can be located in the work surface 22 to help position and retain the electronic device 40.

Figure 5C:
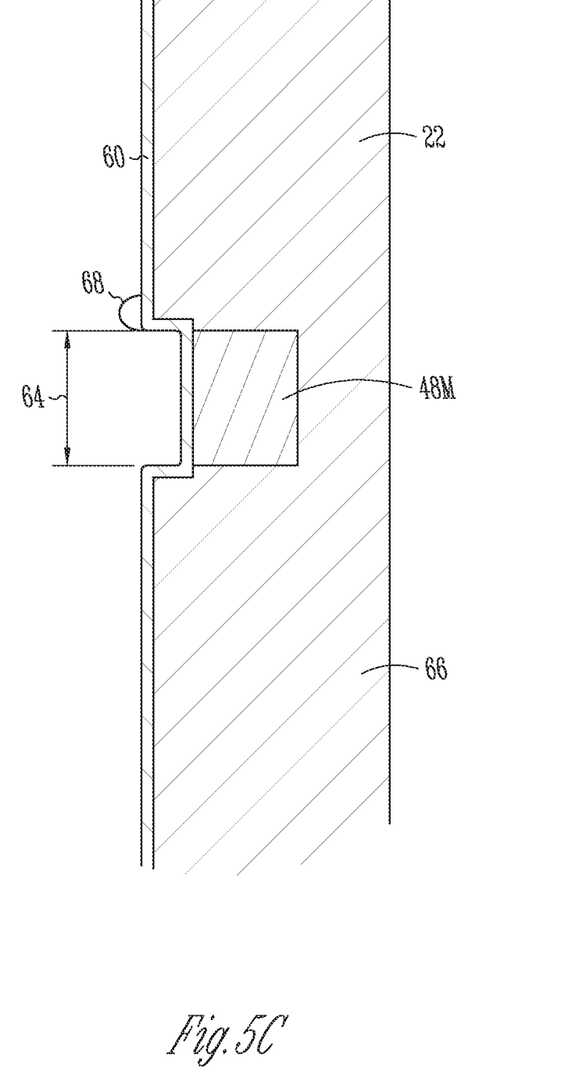
FIG. 5C is an enlarged view taken along line 5C-5C in FIG. 5B.

FIG. 5C is an enlarged view taken along line 5C-5C in FIG. 5B. One or more magnets 48M, e.g., high strength magnets, can be located in the groove 4 before the cover 60 can be disposed over the work surface 22. In one example, the magnet(s) be neodymium magnets, e.g., grade N42. The cover 60 can cover all or a portion of the work surface 22.

In some examples, a cover of the electronic device 40 (see FIG. 2) can include one or more magnets, and can also function as a kickstand to support the device in an upright position. In such an example, the groove 24 defined by the work surface 22 can be configured to hold a portion of the cover/kick-stand, e.g., a flat portion of the cover that contacts the work surface. To accommodate the portion of the cover/kickstand, the groove width 64 of the groove depicted in FIG. 5C, for example, can be increased.

In other examples, the cover does not define a groove or other recessed portion. In contrast to the example shown in FIG. 5C, the cover can be flat and be positioned over the magnet(s) located on and/or within a substrate 66 of the work surface 22. The substrate 66 can be wood, metal, plastic, fiberglass, composites, or combinations of the aforementioned materials.

In some examples, a protruding structure 68 such as one or more protrusions or ridges can be positioned on the cover 60, or configured as part of the cover 60 or work surface 22, to help retain an edge 41A-B of the electronic device 40 (see FIG. 2), with one or more magnets positioned on and/or in the substrate 66 of the work surface 22 to hold the electronic device 40 onto the work surface 22.

Figure 6:
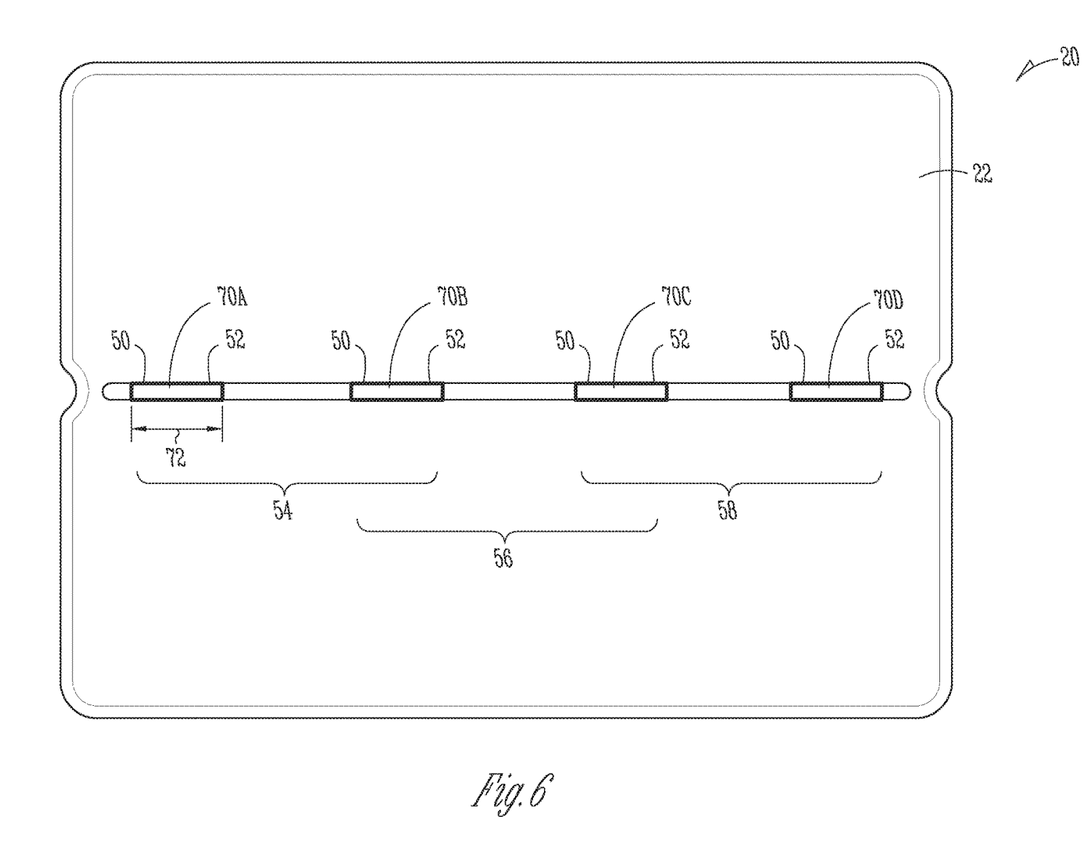
FIG. 6 is a top view of another example of a work surface of a computing stand, in accordance with at least one example of this disclosure.

FIG. 6 is a top view of another example of a work surface 22 of a computing stand 20, in accordance with at least one example of this disclosure. The work surface 22 can include a groove 24 or other recessed portion. Magnets 70A-D can be positioned in the groove 24. Magnets 70A-D can be positioned such that their long dimension 72 can be substantially aligned with the length of the groove 24. In this example, a first polarity 50 and a second polarity 52 of each magnet 70A-D can be exposed to the electronic device 40 that can be positioned on the work surface 22 (see FIG. 2). In an example, the positions of the first polarity 50 and the second polarity 52 of one or more of the magnets 70A-D can be reversed according to the needs of the electronic devices that are being retained. For example, magnet 70B can have the second polarity 52 to the left and the first polarity 50 to the right. As described in FIG. 4, the magnets 70A-D can be arranged to provide location positions of an electronic device 40 near the left of the work surface 22, as in the first holding position 54, near the center as in the second holding position 56 and near the right as in the third holding position 58. In another example, more than two sets of magnets can attract and retain the electronic device 40. In another example, less than two sets of magnets can attract and retain the electronic device 40.

Additional Notes

Each of these non-limiting examples can stand on its own, or can be combined in various permutations or combinations with one or more of the other examples.

The above detailed description includes references to the accompanying drawings, which form apart of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples or one or more aspects thereof) shown or described herein.

In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (for one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A computing stand for supporting an electronic device, the stand comprising:
    an unencumbered horizontal planar work surface having an upper surface and a lower surface, wherein the upper surface is sized and shaped to support the electronic device;
    a hollow recess defined by a portion of the upper surface, the hollow recess extending from the upper surface toward the lower surface;
    one or more magnets positioned between a bottom of the hollow recess and the lower surface;
    a height adjustable riser attached to the work surface, wherein the height adjustable riser includes a stationary column and a movable column;
    a base attached to the height adjustable riser; and
    a control handle configured to release and latch the height adjustable riser,
    wherein the one or more magnets are positioned to attract to one or more magnets coupled to an edge of at least one of the electronic device, a keyboard of the electronic device, and a kickstand of the electronic device.

2. The computing stand of claim 1, wherein the recessed portion is a groove extending substantially parallel to a rear edge of the work surface.

3. The computing stand of claim 1, wherein the one or more magnets are grouped in a set of magnets having at least a first magnet and a second magnet.

4. The computing stand of claim 3, wherein the first magnet has a first polarity located near the upper surface and the second magnet has a second polarity located near the upper surface.

5. The computing stand of claim 1, wherein the one or more magnets are grouped in a set of magnets having at least a first magnet, a second magnet, and a third magnet.

6. The computing stand of claim 5, wherein the work surface has an upper surface and a lower surface, wherein the first magnet has a first polarity located near the upper surface, the second magnet has a second polarity located near the upper surface, and the third magnet has the first polarity located near the upper surface.

7. The computing stand of claim 3, further comprising at least two sets of magnets.

8. The computing stand of claim 3, further comprising four sets of magnets that are spaced to provide a first holding position, a second holding position and a third holding position, wherein each holding position includes two sets of magnets.

9. The computing stand of claim 3, wherein the first magnet and the second magnet are located to correspond with a location of magnets in the at least one of the electronic device, the keyboard of the electronic device and the kickstand of the electronic device, the first magnet and the second magnet having opposite polarity with corresponding magnets in the at least one of the electronic device, the keyboard of the electronic device, and the kickstand of the electronic device.

10. The computing stand of claim 1, wherein the height adjustable riser includes an energy storage member.

11. The computing stand of claim 1, wherein the work surface includes a substrate and a cover disposed over the substrate.

12. The computing stand of claim 1, wherein the base includes one or more wheels.

13. The computing stand of claim 1, wherein the work surface includes a protruding structure configured to retain an edge of the at least one of the electronic device, the keyboard, and the kickstand.

14. A device for supporting an electronic device, the device comprising:
- an unencumbered horizontal planar work surface including:
  - an upper surface, wherein the upper surface is sized and shaped to support the electronic device;
  - a lower surface;
  - a hollow recess defined by a portion of the upper surface, the hollow recess extending from the upper surface toward the lower surface;
  - one or more magnet sets positioned between a bottom of the hollow recess and the lower surface, each magnet set including a first magnet and a second magnet, the first magnet having a first polarity located near the upper surface and the second magnet having a second polarity located near the upper surface, wherein the one or more magnet sets are positioned to attract to one or more magnets coupled to an edge of at least one of an electronic device, a keyboard of the electronic device, and a kickstand of the electronic device;
- a height adjustable riser attached to the work surface, wherein the height adjustable riser includes a stationary column and a movable column;
- a base attached to the height adjustable riser; and
- a control handle configured to release and latch the height adjustable riser.

15. The device of claim 14, further comprising:
- a height adjustable riser coupled to the work surface and a wheeled base coupled to the height adjustable riser.

16. The device of claim 14, further comprising four sets of magnets that are spaced to provide a first holding position, a second holding position, and a third holding position, wherein each holding position includes two sets of magnets.

17. A device for supporting an electronic device, the device comprising:
- an unencumbered horizontal planar work surface including:
  - an upper surface, wherein the upper surface supports the electronic device;
  - a lower surface;
  - a hollow recess defined by a portion of the upper surface, the hollow recess extending from the upper surface toward the lower surface;
  - at least one or more magnets positioned between a bottom of the hollow recess and the lower surface, wherein the at least one or more magnets are positioned to attract to one or more magnets coupled to an edge of at least one of an electronic device, a keyboard of the electronic device, and a kickstand of the electronic device, wherein at least one of the at least one or more magnets includes a south pole and a north pole and wherein both the north pole and the south pole are near an upper surface of the work surface;
- a height adjustable riser attached to the work surface, wherein the height adjustable riser includes a stationary column and a movable column;
- a base attached to the height adjustable riser; and
- a control handle configured to release and latch the height adjustable riser.

18. The computing stand of claim 17, wherein the work surface includes a protruding structure configured to retain an edge of the at least one of the electronic device, the keyboard, and the kickstand.

19. The computing stand of claim 17, wherein the one or more magnets are grouped in a set of magnets having at least a first magnet and a second magnet.

20. The computing stand of claim 17, wherein the recessed portion is a groove extending substantially parallel to a rear edge of the work surface.

* * * * *

UNITED STATES PATENT AND TRADEMARK OFFICE
CERTIFICATE OF CORRECTION

PATENT NO. : 9,949,561 B2  
APPLICATION NO. : 15/071954  
DATED : April 24, 2018  
INVENTOR(S) : Stuart Ripley Aldrich Page 1 of 1

It is certified that error appears in the above-identified patent and that said Letters Patent is hereby corrected as shown below:

In the Specification

In Column 1, Line 14, delete "TECHNICAL HELD" and insert --TECHNICAL FIELD-- therefor In Column 4, Line 38, delete "or," and insert --or-- therefor In Column 5, Line 23, delete "station" and insert --surface-- therefor In Column 6, Line 27, delete "4" and insert --24-- therefor In Column 6, Line 29, after "magnet(s)", insert --can--

In Column 7, Line 18, delete "apart" and insert --a part-- therefor

In Column 7, Line 30, before "or", insert --(--

In Column 7, Line 54, delete "(for" and insert --(or-- therefor

In the Claims

In Column 10, Line 29, in Claim 18, delete "computing stand" and insert --supporting device-- therefor In Column 10, Line 33, in Claim 19, delete "computing stand" and insert --supporting device-- therefor In Column 10, Line 36, in Claim 20, delete "computing stand" and insert --supporting device-- therefor Signed and Sealed this  
Eleventh Day of June, 2019

Andrei Iancu  
*Director of the United States Patent and Trademark Office*